United States Patent [19]

Eft

[11] 4,010,943
[45] Mar. 8, 1977

[54] POWER DRILL SUPPORT AND GUIDE APPARATUS

[76] Inventor: Sheldon E. Eft, 1014 E. Taylor St., Bloomington, Ill. 61701

[22] Filed: July 3, 1975

[21] Appl. No.: 593,174

[52] U.S. Cl. .................... 269/87.1; 408/115 R; 408/712

[51] Int. Cl.² ........................................ B23B 45/14

[58] Field of Search .............. 408/92, 94, 97, 108, 408/115, 712; 269/87.1

[56] References Cited

UNITED STATES PATENTS

| | | | |
|---|---|---|---|
| 907,735 | 12/1908 | Cain | 408/97 |
| 2,783,665 | 3/1957 | Saunders | 408/108 |
| 2,888,965 | 6/1959 | Phillips | 408/712 |
| 2,943,653 | 7/1960 | Crider | 408/108 |
| 2,997,900 | 8/1961 | Pugsley | 408/712 |
| 3,060,769 | 10/1962 | Heider | 408/712 |
| 3,741,670 | 6/1973 | Wood | 408/92 |
| 3,775,020 | 11/1973 | Stoutenberg | 408/115 |

Primary Examiner—Al Lawrence Smith
Assistant Examiner—Robert C. Watson
Attorney, Agent, or Firm—Fitch, Even, Tabin & Luedeka

[57] ABSTRACT

An apparatus for supporting a power driven drill for drilling holes in a workpiece, such as a beam and the like, is disclosed which includes a support frame having clamping members for fixedly securing the frame to the workpiece, and having drill support and guide means operative to stabilize and guide the drill as it is fed into the workpiece by means of a manual power screw.

15 Claims, 5 Drawing Figures

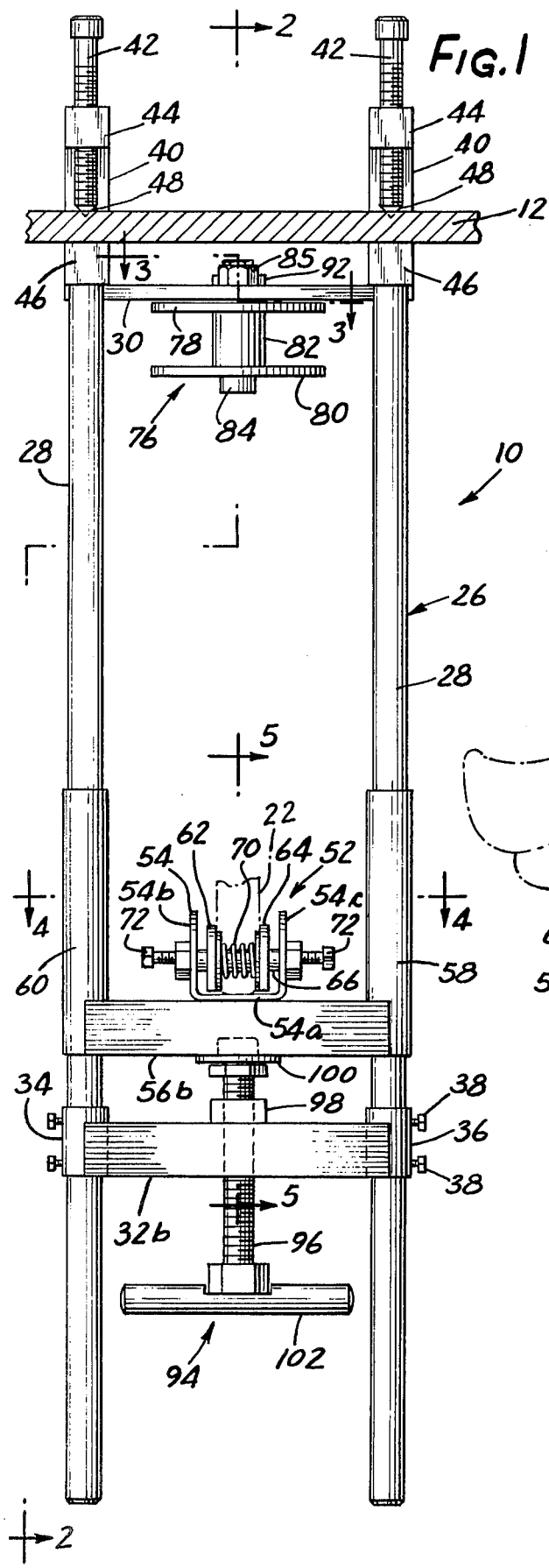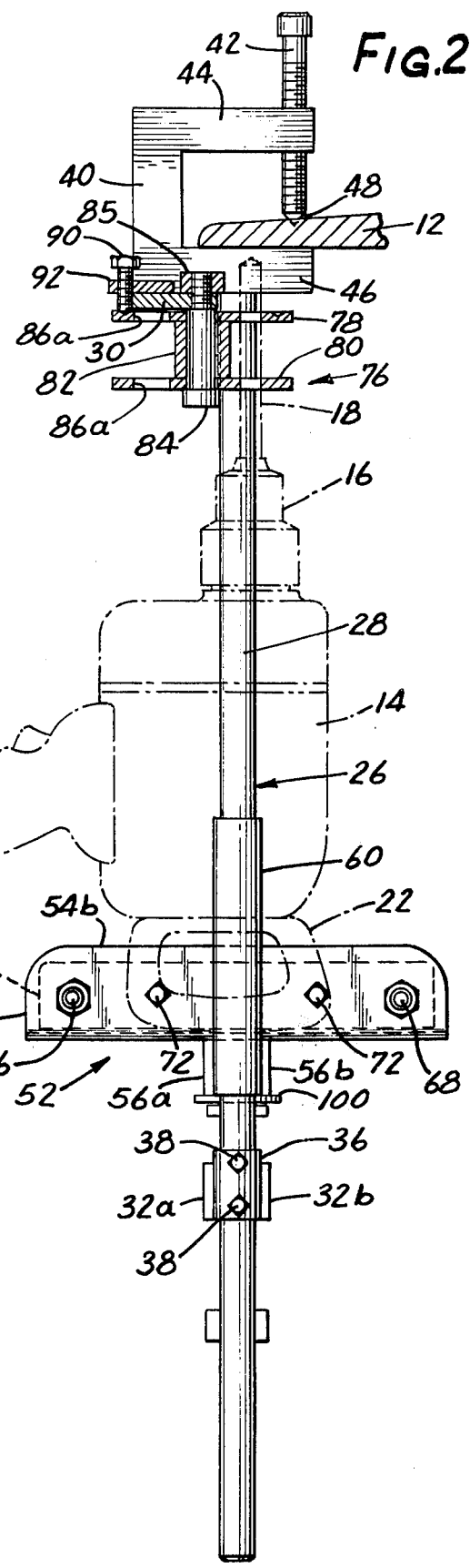

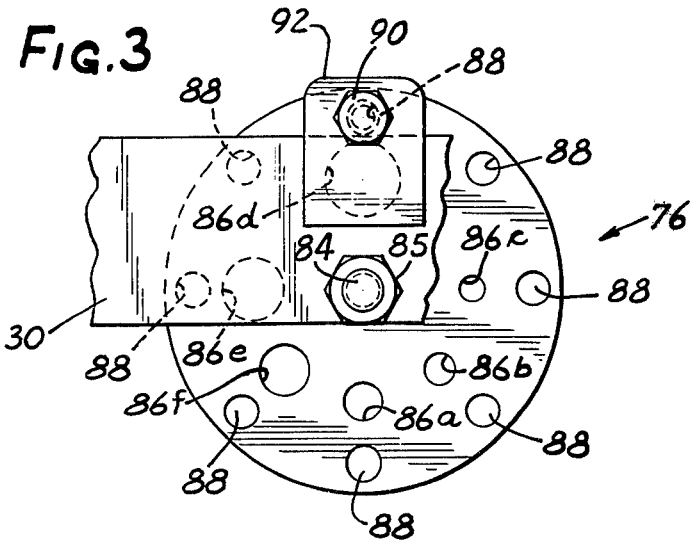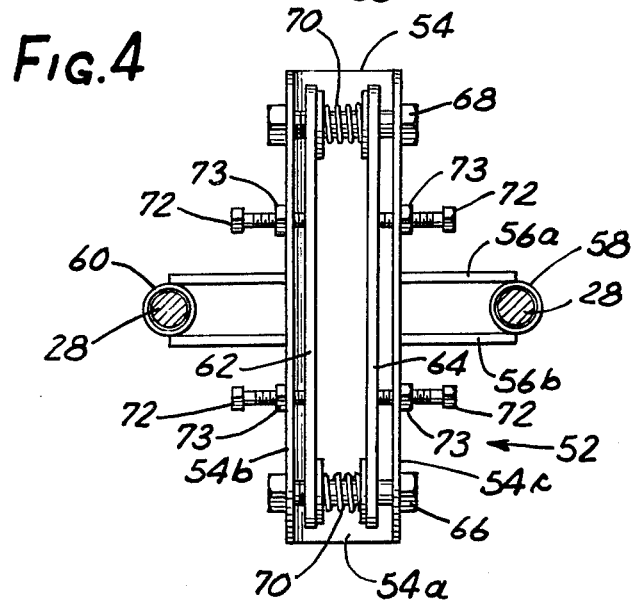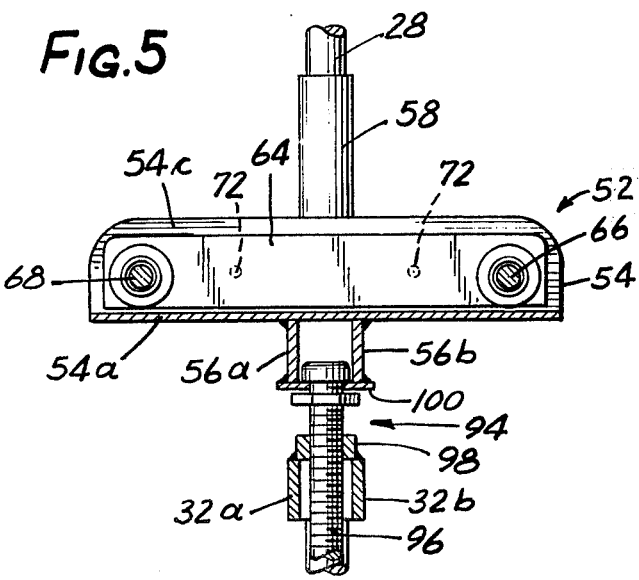

POWER DRILL SUPPORT AND GUIDE APPARATUS

The present invention relates generally to apparatus for use in drilling holes in beams and the like, and more particularly to novel apparatus for supporting and guiding a power driven drill during drilling of holes in structural beams, plates and the like.

In the construction of buildings which employ structural steel beams and plates, it is frequently necessary to drill one or more holes in a flange of an I-beam or in a plate which is spaced a substantial distance above the ground or floor surface upon which the worker normally stands, thus necessitating the use of a ladder to reach the beam or plate. The drills required to accomplish the desired drilling are relatively heavy and are quite cumbersome to handle during drilling when using conventional drilling techniques. As a result, the operator's safety is sometimes jeopardized while attempting a safely maintain his balance on the ladder. The necessity of holding and forcing the relatively heavy drill against a flange of a beam or against a metallic plate, has resulted in serious injuries due either to the operator falling from the ladder or, on some occasions, having the drill fall from his hands with resultant injury to other persons.

One known apparatus for use in such drilling operations includes a drill support fixture which employs an electromagnet to secure the fixture to the bottom of a beam or plate while drilling holes in or through the beam. Apparatus of this known type exhibit a major disadvantage in that the electrical cord which interconnects the electromagnet to an electric power source may be accidentally cut or severed, or the power otherwise interrupted during a drilling operation causing the drill and support fixture to fall with resulting bodily injury to both the immediate operator and to others in the general area, not to mention damage to the drill and support fixture.

In accordance with the present invention, the aforenoted disadvantage is substantially eliminated by the provision of a drill support apparatus which may be fixedly mechanically secured to a beam or plate through which it is desired to drill holes, the drill support apparatus thus eliminating any need for electromagnets or other means which utilize electric power supplies susceptible to interruption.

One of the primary objects of the present invention is to provide a novel apparatus for supporting and guiding a power drill during drilling of holes in or through structural beams, plates and the like.

Another object of the present invention is to provide an apparatus for use in drilling holes in structural beams and plates which includes a support frame having means thereon for fixedly securing the frame to a beam to be drilled and including power driven drill support and guide means which prevent bending or breakage of drill bits during drilling operations.

Another object of the present invention is to provide such a drill support apparatus which includes means for fixedly retaining a power driven drill on a predetermined axis while being fed against a workpiece by means of a power screw supported on the support frame.

A feature of the apparatus in accordance with the present invention lies in the provision of clamps having associated pointed locking screws which fixedly secure the support frame to a beam or plate in a manner to prevent accidental release of the drill support frame from the beam.

Yet another feature of the present invention is the provision of a novel support carriage which is adapted to receive and fixedly clamp the handle portion of a conventional power driven drill therein, together with novel guide means aligned with the support carriage and disposed to receive the drill bit therethrough during the full drilling operation whereby misalignment and resultant bending or breakage of the drill bit is eliminated.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 1 is a front elevational view illustrating a drill support and guide apparatus in accordance with the present invention secured to a structural beam or plate, a portion of the handle of a power driven drill being shown in phantom;

FIG. 2 is a side view, taken partly in section along the line 2—2 of FIG. 1, of the drill support and guide apparatus but with the drill being fully shown in phantom preparatory to drilling a hole in the beam;

FIG. 3 is a partial transverse sectional view taken substantially along the line 3—3 of FIG. 1 to better illustrate the drill guide plates and associated rotational position locking mechanism;

FIG. 4 is a partial transverse sectional view taken substantially along the line 4—4 of FIG. 1 to illustrate the drill support carriage and associated clamping plates; and FIG. 5 is a partial vertical sectional view taken substantially along the line 5—5 of FIG. 1 to better illustrate the drill support carriage and associated feed screw.

Referring now to the drawings, and in particular to FIGS. 1 and 2, apparatus constructed in accordance with the present invention for supporting a power driven drill for use in drilling a hole in or through a workpiece is indicated generally at 10. For purposes of illustration, the apparatus 10 is shown in conjunction with the flange of a structural steel I-beam, the flange portion of which is indicated at 12. The apparatus 10 might thus, for purposes of the following description, be termed a beam drilling apparatus or device. It will be understood, however, that the apparatus 10 may be employed in drilling a workpiece of substantially any configuration to which the apparatus 10 may be fixedly clamped or secured, as will become more apparent hereinbelow. By mechanically securing the apparatus 10 to the structural beam or plate to be drilled, the apparatus finds particular application in elevated drilling operations such as when the operator must climb a ladder to reach an elevated beam or plate through which one or more holes are to be drilled.

The apparatus 10 is illustrated in FIG. 2 in operative association with a power driven drill 14 which may comprise a conventional electric drill. The drill 14 is of a size as used in drilling steel beams or plates which may approach approximately 2 inches in thickness. The drill 14 includes a collet chuck 16 which receives a drill bit 18 in a known manner. In the illustrated embodiment, the drill 14 includes a trigger handle 20 and a rear handle 22, the trigger handle 20 having an operating switch therein in a known manner.

The drill support apparatus 10 includes frame means, indicated generally at 26, in the form of a pair of guide rods 28 which are maintained in parallel spaced relation by an upper cross bar 30 and a pair of parallel spaced lower cross bars 32a and 32b. In the illustrated embodiment the upper cross bar 30 has its opposite ends secured, as by welding, to C-shaped clamps 40 which are secured on the upper ends of the guide rods 28. The bar 30 could, however, be affixed directly to the guide rods 28. The lower cross bars 32a and 32b have their opposite ends connected to tubular sleeves 34 and 36, respectively, which are selectively slidable along the cylindrical guide rods 28. Set screws 38 are carried by the sleeves 34 and 36 and are operable to fixedly secure the sleeves and associated cross bars 32a and 32b at a desired position on the guide rods 28.

The guide rods 28 are of equal length and each has one of the C-shaped clamps 40 secured to its upper end such that the clamps 40 lie in parallel planes and open in a common direction relative to a plane containing the longitudinal axes of the guide rods 28. Each clamp 40 has a clamping screw 42 threadedly received through a suitable threaded opening in an upper arm portion 44 of the associated clamp such that the clamp screws may be threaded downwardly toward opposed lower arms 46 of the clamps 40. The clamping screws 42 have pointed lower ends 48 to facilitate locking engagement with the flange or workpiece 12. It can be seen that with the clamping screws 42 disposed in outer positions relative to their associated clamp arms 44, the clamps and associated guide rods 28 can be assembled onto the edge of the beam flange 12 and the clamping screws threaded downwardly such that the clamps are locked onto the flange 12, the lower arms 46 of the clamps being in abutting relation with the lower or under surface of the flange 12 and the rods 28 being substantially perpendicular to the plane of the lower surface of the flange 12.

A support carriage, indicated generally at 52, is supported on and slidable along the guide rods 28 which define a rectilinear guide track. The support carriage 52 is adapted to support the drill 14 and for this purpose includes a U-shaped channel member 54 which has a web portion 54a and integral upstanding parallel spaced side walls 54b and 54c. The channel member 54 is supported by and in transverse relation to a pair of parallel spaced cross-plates 56a and 56b. The opposite ends of the cross plates 56 are suitably secured to identical tubular sleeves 58 and 60 each of which is coaxial with and slidable along an associated one of the guide rods 28. In this manner, the longitudinal axis of the channel member 54 is substantially normal to a plane containing the longitudinal axes of the guide rods 28 and maintains this relationship throughout movement of the support carriage 52 along the guide rods.

With particular reference to FIGS. 4 and 5, taken in conjunction with FIG. 1, the channel member 54 has a pair of clamping plates 62 and 64 supported in upstanding parallel relation between the channel walls 54b and 54c by a pair of cross bolts 66 and 68 which allow the clamping plates to be moved relative to each other. A coil compression spring 70 is disposed about each of the cross bolts 66 and 68 between the clamping plates 62 and 64 to bias the clamping plates to spaced apart positions. A pair of adjusting screws 72 are threadedly received through suitable threaded openings in each of the upstanding channel walls 54b and 54c, or through nuts 73 (FIG. 4) affixed to the channel walls adjacent openings therethrough, with the inner ends of the adjusting screws being in abutting relation with the associated clamping plates 62 and 64. The adjusting screws 72 may be thus manually threaded inwardly or outwardly relative to their respective channel walls 54b and 54c to effect a corresponding inward or outward movement of the clamping plates 62 and 64 relative to each other. In mounting the drill 14 within the support carriage 52, the rear handle 22 is positioned between the clamping plates 62 and 64 which are then adjusted to clamping positions against the rear handle by means of the adjusting screws 72.

To provide guidance for the drill bit 18 of the drill 14 during a drilling operation, drill guide means, indicated generally at 76, are provided which are supported by the frame means 26 adjacent the C-shaped clamps 40. The drill guide means 76 is vertically aligned with the support carriage 52, as considered in FIG. 1, and cooperates therewith to maintain the drill 14 in a position wherein the axis of the drill and drill bit 18 is parallel to the axes of the guide rods 28. In this manner, the axis of the drill bit 18 will be disposed perpendicular to the plane of the lower surface of the flange or workpiece 12. The drill guide means 76 insures that the drill bit 18 will not wander during drilling with possible resulting sticking or breaking of the drill bit.

The drill guide means 76 includes a pair of circular guide plates 78 and 80 which are secured together in parallel spaced relation by a tubular spacer 82 connected to the respective circular guide plates at their centers. The guide plates 78 and 80 and the tubular spacer 82 are supported on a pivot pin or bolt 84 which is received through the spacer and suitable center openings in the guide plates, the upper end of the pivot bolt being secured to the transverse plate 30 at its center by a nut 85. In this fashion, the circular guide plates 78 and 80 are rotatable about an axis parallel to and equidistantly spaced from the guide rods 28, with the axis of rotation passing through the longitudinal center line of the web 54a of the channel member 54.

With reference to FIG. 3, taken in conjunction with FIG. 2, each of the circular guide plates 78 and 80 has a plurality of sized openings 86a–86f which are circumferentially spaced about the axis of rotation of the respective guide plates as shown. The apertures 86a–86f in the guide plate 78 preferably have their centers disposed on a common circle and are axially aligned with the corresponding apertures 86a–86f in the guide plate 80 such that the guide plates define pairs of axially aligned drill guide apertures each pair of which is of different diameter than the other pairs of aligned apertures. The pairs of apertures 86a –86f are sized to receive predetermined drill bit diameters so as to allow rotation of the associated drill bits while providing guidance therefor. The peripheral surfaces of the drill apertures 86a –86f are suitably hardened or may comprise drill guide bushings or known design.

The upper guide plate 78 is provided with a plurality of equal size conical recesses 88, such as formed by the conical end of a conventional twist drill. The recesses 88 are disposed on a common circle concentric with the center of the guide plate 78 so that during rotation of the guide plate 78, the depressions 88 pass below and in axial alignment with a locking screw 90 received through a suitable threaded aperture in a bracket plate 92. The bracket plate 92 is mounted on the cross bar 30 centrally of its length. A recess 88 is provided in radial alignment with but diametrically opposite to each of the drill apertures 86a–f such that rotation of the guide plates 78 and 80 to a location positioning a selected pair of the drill apertures 86a –86f in alignment with the channel member 54 to receive a drill bit will correspondingly position the associated diametrically opposite depression 88 in underlying relation to the locking screw 90. Thereafter, the locking screw may be moved to a locking position with the underlying depressions 88 to lock the guide plates 78 and 80 in the selected rotational position.

With the drill 14 and associated drill bit 18 positioned within the support carriage 52 and drill guide means 78, respectively, the drill may be moved along the guide rods 28 during a drilling operation by feed screw means, indicated generally at 94. As best seen in FIGS. 1 and 5, the feed screw means 94 is supported by the frame means 26 and is cooperative with the support carriage 52 to effect selective movement of the support carriage along the guide track defined by the guide rods 28 so that the drill 14 may be caused to drill a hole in the flange 12. The feed screw means 96 includes a threaded feed screw 96 which is received through a threaded nut 98 affixed centrally to the cross bars 32a and 32b. The upper end of the feed screw 96 is axially retained by but rotatable within a plate 100 secured to the cross-plates 56a and 56b at substantially their midpoints. The lower end of the feed screw 96 has a rod handle 102 affixed thereto in transverse relation to the axis of the feed screw. The rod handle 102 provides means for manually rotating the feed screw 96 which, with the lower bars 32a and 32b affixed to the guide rods 28, will effect movement of the support carriage 52 along the guide rods in relation to the rotational direction imparted to the feed screw 96. The feed screw 96 and associated rod handle 102 may be selected to provide a mechanical advantage such that the operator need only apply approximately 40 ft. lbs. torque to the feed screw to obtain an axial force of 2,000 pounds at the cutting face of the drill bit 18 during a drilling operation.

Having thus described a preferred embodiment of the apparatus 10, it will be appreciated that in mounting the drill 18 on the apparatus the feed screw 94 is rotated in a direction to move the support carriage 52 to a lowered position. The drill is then manipulated to insert the drill bit 18 through the appropriate pair of previously positioned drill apertures 86 in the circular guide plates 78 and 80, and the rear handle 22 of the drill is positioned within the channel member 54 of the support carriage 52. The clamping plates 62 and 64 are then tightened against the rear handle 22 of the drill 14 to firmly retain the drill within the support carriage with the axis of the drill bit 18 being parallel to the longitudinal axes of the guide rods 28. It will be recalled that the cross bars 32a and 32b may be selectively positioned along the lengths of the guide rods 28 which also serves to position the support carriage 52 through its connection to the feed screw 96.

With the drill 14 thus mounted on the apparatus 10, the apparatus may be moved to the work area for mounting on a workpiece, such as the flange 12, by means of the C-shaped clamps 40. The feed screw 96 may then be manually rotated in a direction to feed the drill and associated drill bit 18 upwardly to effect drilling in or through the flange 12. After drilling, the feed screw 96 is rotated in an opposite direction to lower the drill bit from the workpiece whereafter the clamping screws 42 are loosened to allow relocation of the apparatus 10 for subsequent drilling or complete removal from the flange 12.

Thus, in accordance with the present invention, an apparatus for use with a drill in the drilling of steel beams or plates is provided which can be fixedly secured to the workpiece being drilled whereby to prevent any accidental release of the drill and supporting fixture during a drilling operation. Additionally, the drill guide means 76 assures that the drill will not "wander" during the drilling operation with resultant bending and possible breakage of the drill bit or inaccuracy in the drilled hole. The feed screw means 94 provides a desirable mechanical advantage to effect upward movement of the drill at the necessary feed force with a relatively light force applied to the feed screw rod handle 102. The support carriage 52 serves to lock the power driven drill in fixed position thereon so that the support carriage cooperates with the drill guide means 76 to retain the drill in a stabilized mounted position throughout the drilling operation without chance of accidental release of the drill from the apparatus.

While a preferred embodiment of the present invention has been illustrated and described, it will be obvious to those skilled in the art that changes and modifications may be made therein without departing from the invention in its broader aspects. Various features of the invention are set forth in the following claims.

What is claimed is:

1. Apparatus for supporting a power driven drill in cooperative relation with a workpiece located overhead and for drilling a hole in the overhead workpiece, comprising, in combination, a depending frame means having first and second ends and defining a rectilinear vertically extending guide track, clamping means mounted on the upper end of said depending frame means and adapted to suspend said frame means to the overhead workpiece, a support carriage mounted on the lower end of said frame means and movable upwardly along said rectilinear guide track, said support carriage being adapted to support a power driven drill for movement therewith, drill guide means mounted on the upper end of said frame means generally adjacent said clamping means and the underside of said workpiece and being adapted to receive a drill bit of the power drill therethrough with sliding of said frame means upwardly along said guide track and for guiding said drill bit along its longitudinal axis during a drilling operation, and actuator means supported by said frame means and cooperative with said support carriage to facilitate selective movement of said carriage along said guide track so that a drill supported by said carriage may be caused to drill a hole in said workpiece and thereafter be removed from said workpiece.

2. Apparatus as defined in claim 1 wherein said frame means comprises a pair of parallel spaced guide rods, and spacer bar means secured to said guide rods to maintain said rods in said parallel spaced relation.

3. Apparatus as defined in claim 1 wherein said clamping means comprises a pair of C-shaped clamps each of which has a clamping screw operative therewith to fixedly clamp a workpiece within the associated clamp such that said rectilinear guide track is disposed substantially perpendicular to said workpiece.

4. Apparatus as defined in claim 3 wherein said C-shaped clamps lie in parallel spaced planes, and wherein each of said clamping screws has a pointed end thereon adapted for engagement with a workpiece disposed within the C-shaped clamps.

5. Apparatus as defined in claim 1 wherein said support carriage includes a U-shaped channel member having a longitudinal axis disposed substantially perpendicular to said rectilinear guide track, and clamping plate means disposed within said channel member and adjustable to fixedly clamp a power drill therein.

6. Apparatus as defined in claim 5 wherein said channel member has a base web portion lying in a plane substantially perpendicular to said rectilinear guide track, said longitudinal axis of said channel member being normal to and intersected by the axis of said guide means, said axis of said guide means being parallel to said guide track.

7. Apparatus as defined in claim 1 wherein said guide means includes a pair of guide plates secured together in substantially parallel relation for simultaneous rotation about a common axis disposed normal to the planes of said guide plates, said guide plates having pairs of axially aligned drill guide apertures therethrough each pair of which is adapted to receive and guide a drill bit of a power driven drill supported by said support carriage.

8. Apparatus as defined in claim 7 wherein each pair of said axially aligned drill guide apertures is of a different diameter than the other drill guide apertures.

9. Apparatus as defined in claim 8 wherein said guide means further includes registration means to locate said guide plates in selected rotational positions about their axis of rotation.

10. Apparatus as defined in claim 2 wherein said actuator means includes a feed screw and support bracket means slidable along said guide rods so that said feed screw and said support carriage may be selectively positioned along the longitudinal lengths of said guide rod, and means for fixedly positioning said support bracket means on said guide rod.

11. Apparatus as defined in claim 10 wherein said feed screw has one end thereof attached to said support carriage, and has a torque rod secured to the other end thereof in transverse relation thereto.

12. Apparatus as defined in claim 11 wherein said feed screw and torque rod are operable to provide a substantially greater axial force from said screw than the force applied normally to said torque rod in a direction to rotate said feed screw.

13. Apparatus for supporting a power driven drill for drilling a hole in or through a flange in an overhead workpiece, comprising, in combination, a depending frame means including a pair of parallel spaced guide rods defining a rectilinear guide track, spacer bar means secured to said guide rods to maintain said guide rods in said parallel spaced relation, a C-shaped clamp secured to the upper end of each of said guide rods and suspending the latter such that said clamps are disposed on corresponding ends of said guide rods and lie in substantially parallel planes containing the longitudinal axis of the associated guide rods with the C-shaped clamps opening in a common direction, each of said C-shaped clamps receiving a portion of the overhead flange therein and having a clamping screw cooperative therewith in a manner to clamp a workpiece within the associated clamps so that said guide rods are disposed substantially perpendicular to said workpiece, a support carriage supported on and slidable along the lower portions of said guide rods, said support carriage including a U-shaped channel member adapted to receive a power driven drill therein, guide plate means supported by said guide rods at the upper ends thereof and generally adjacent said C-shaped clamps, said guide plate means being aligned with said channel member and adapted to receive the drill bit of a power driven drill in guiding relation therethrough during a drilling operation, and feed screw means supported by said guide rods and operatively associated with said support carriage in a manner to facilitate selective movement of said support carriage and an associated power driven drill along said guide rods to effect drilling of a workpiece disposed within said C-shaped clamps.

14. Apparatus as defined in claim 13 including clamping plate means supported within said channel member of said support carriage, and adjustment means operatively associated with said clamping plate means to effect clamping of said clamping plate means against a power driven drill received within said channel member for fixedly retaining said drill therein.

15. Apparatus as defined in claim 13 wherein said guide means includes a pair of parallel spaced guide plates secured together for simultaneous rotation about a common axis substantially parallel to said guide rods, said guide plates defining pairs of axially aligned drill guide apertures therethrough, each pair of drill guide apertures being of a different diameter than the other pairs of apertures.

* * * * *